United States Patent
Yamamoto

(10) Patent No.: US 10,585,755 B2
(45) Date of Patent: Mar. 10, 2020

(54) ELECTRONIC APPARATUS AND METHOD FOR RESTARTING A CENTRAL PROCESSING UNIT (CPU) IN RESPONSE TO DETECTING AN ABNORMALITY

(71) Applicant: Hideaki Yamamoto, Kanagawa (JP)

(72) Inventor: Hideaki Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 131 days.

(21) Appl. No.: 15/687,973

(22) Filed: Aug. 28, 2017

(65) Prior Publication Data

US 2018/0150359 A1 May 31, 2018

(30) Foreign Application Priority Data

Nov. 29, 2016 (JP) .................................. 2016-231218
Apr. 13, 2017 (JP) .................................. 2017-079691

(51) Int. Cl.
*G06F 11/00* (2006.01)
*G06F 11/14* (2006.01)
*G06F 11/07* (2006.01)

(52) U.S. Cl.
CPC ...... *G06F 11/1441* (2013.01); *G06F 11/0724* (2013.01); *G06F 11/0757* (2013.01); *G06F 11/0793* (2013.01); *G06F 2201/805* (2013.01)

(58) Field of Classification Search
CPC ............. G06F 11/0724; G06F 11/0757; G06F 11/0793; G06F 11/1441
See application file for complete search history.

(56) References Cited

U.S. PATENT DOCUMENTS

| | | | |
|---|---|---|---|
| 6,732,044 B2* | 5/2004 | Hashimoto | F02D 41/26 701/1 |
| 7,496,800 B2* | 2/2009 | Koto | G06F 11/0757 714/51 |
| 2005/0138249 A1* | 6/2005 | Galbraith | G06F 15/17 710/100 |
| 2008/0152261 A1 | 6/2008 | Yamamoto | |
| 2010/0322646 A1 | 12/2010 | Yamamoto et al. | |
| 2012/0089861 A1* | 4/2012 | Cardinell | G06F 11/0724 714/2 |
| 2013/0254598 A1* | 9/2013 | Yamashita | G06F 11/0757 714/55 |

(Continued)

FOREIGN PATENT DOCUMENTS

| JP | 2005-100029 | 4/2005 |
|---|---|---|
| JP | 2005-284329 | 10/2005 |

(Continued)

*Primary Examiner* — Elmira Mehrmanesh
(74) *Attorney, Agent, or Firm* — Harness, Dickey & Pierce, P.L.C.

(57) ABSTRACT

An electronic apparatus includes a central processing unit (CPU). The CPU includes a plurality of cores and restarting means. The plurality of cores includes at least a first core and a second core. The first core includes active monitoring means for actively monitoring an abnormality of the second core. The second core includes passive monitoring means for passively monitoring an abnormality of the first core. The restarting means restarts the CPU in response to detection of the abnormality of the first core or the second core by one of the active monitoring means and the passive monitoring means.

13 Claims, 11 Drawing Sheets

(56) References Cited

U.S. PATENT DOCUMENTS

| | | | | |
|---|---|---|---|---|
| 2013/0339663 | A1* | 12/2013 | Chang | G06F 11/0724 |
| | | | | 712/29 |
| 2015/0006978 | A1* | 1/2015 | Tokunaga | G06F 11/0724 |
| | | | | 714/55 |
| 2015/0067401 | A1* | 3/2015 | Ichikawa | G06F 11/0766 |
| | | | | 714/37 |
| 2016/0063281 | A1* | 3/2016 | Kahana | G06F 21/71 |
| | | | | 726/27 |
| 2016/0314057 | A1* | 10/2016 | De Oliveira | G06F 11/1484 |
| 2016/0335149 | A1* | 11/2016 | David | G06F 11/0757 |
| 2016/0347326 | A1* | 12/2016 | Iwagami | B60W 10/06 |
| 2016/0378587 | A1* | 12/2016 | Zhang | G06F 11/0757 |
| | | | | 714/55 |
| 2017/0269984 | A1* | 9/2017 | Idapalapati | G06F 11/0757 |

FOREIGN PATENT DOCUMENTS

| | | | | |
|---|---|---|---|---|
| JP | 2005-346328 | | 12/2005 | |
| JP | 2008-160404 | | 7/2008 | |
| JP | 2009-054041 | | 3/2009 | |
| JP | 2010-020809 A | * | 2/2010 | ............. G06F 11/30 |
| JP | 2011-002572 | | 1/2011 | |
| JP | 2011-159136 | | 8/2011 | |
| JP | 2013-149128 | | 8/2013 | |
| JP | 2013-180074 | | 9/2013 | |
| JP | 2013-242811 | | 12/2013 | |
| JP | 2017-041007 | | 2/2017 | |

* cited by examiner

| APPLICATION | END SEQUENCE (KILL OBJECT) |
|---|---|
| APP1 | kill1 |
| APP2 | shutdown2 |
| APP3 | kill3 |
| APP4 | shutdown4 |
| ⋮ | ⋮ |

| APPLICATION | END SEQUENCE (KILL OBJECT) |
|---|---|
| APP10 | shutdown10 |
| APP11 | shutdown11 |
| APP12 | kill12 |
| APP13 | kill13 |
| ⋮ | ⋮ |

ELECTRONIC APPARATUS AND METHOD FOR RESTARTING A CENTRAL PROCESSING UNIT (CPU) IN RESPONSE TO DETECTING AN ABNORMALITY

CROSS-REFERENCE TO RELATED APPLICATIONS

This patent application is based on and claims priority pursuant to 35 U.S.C. § 119(a) to Japanese Patent Application Nos. 2016-231218, filed on Nov. 29, 2016 and 2017-079691, filed on Apr. 13, 2017, in the Japan Patent Office, the entire disclosure of each of which is hereby incorporated by reference herein.

BACKGROUND

Technical Field

Aspects of the present disclosure relate to an electronic apparatus, a method of restarting a central processing unit (CPU), and a non-transitory recording medium storing a program to cause the CPU to perform the method.

Related Art

In computer systems in which fail/safe is of importance, in a case where an error such as runaway of software or a stall occurs, it is requested to shorten a down time by stopping the system safely as possibly as can and then, automatically restarting the system.

A process enabling such automatic restart has been used not only in the field of mission-critical servers but also in the field of gaming devices and network games, from which users does not get off the viewpoints, such as vehicle-loaded devices, Pachinko, and Pachinko-slot of which performance is changed much when the devices are not normally operated.

Until now, various mechanisms used for sensing an abnormal state of software and automatically restarting the software have been devised, and technologies for automatic recovery from an abnormal state are known. For example, conventionally, a technology for sensing runaway of a system by being triggered upon the activation of a watchdog timer for detecting an abnormality of software has been known.

In addition, as software operating on a central processing unit (CPU), in addition to an operating system (OS), application programs are present. There are also cases where an application program generates various exception violations to cause a core dump. In addition, in programming technologies of recent years, coding for efficiently completing the process by executing a plurality of processes in parallel such as a pipeline process or speculative command execution and efficiently using results of the processes in each process is frequently used.

In such a form, an execution state of an application program in which a normal operation of an application program will be damaged in the future although a fault end of a CPU is not caused is also considered. For example, as factors causing the execution state of an application program damaging a normal operation, there are a scheduling violation, a memory protection violation, an exclusive control violation, and the like. In such cases, although the CPU core operates without any failure, a normal end will be damaged in the future.

In a case where a failure at the time of execution at an application level occurs, for example, in the case of a built-in system, when a CPU in which the failure occurs is immediately reset, external apparatuses operating regardless of the internal state of the CPU are influenced. For this reason, also in a case where a failure in an application program other than the stall of an OS occurs, it is required to appropriately reset the system.

SUMMARY

In an aspect of the present disclosure, there is provided an electronic apparatus that includes a central processing unit (CPU). The CPU includes a plurality of cores and restarting means. The plurality of cores includes at least a first core and a second core. The first core includes active monitoring means for actively monitoring an abnormality of the second core. The second core includes passive monitoring means for passively monitoring an abnormality of the first core. The restarting means restarts the CPU in response to detection of the abnormality of the first core or the second core by one of the active monitoring means and the passive monitoring means.

In another aspect of the present disclosure, there is provided a method of restarting a CPU including a plurality of cores. The plurality of cores includes at least a first core and a second core. The method includes actively monitoring an abnormality of the second core with the first core; passively monitoring an abnormality of the first core with the second core; and restarting the CPU in response to detection of the abnormality of the first core or the second core detected by one of the actively monitoring and the passively monitoring.

In still another aspect of the present disclosure, there is provided a non-transitory recording medium that stores a program to cause a CPU including a plurality of cores to execute a method of restarting the CPU. The plurality of cores includes at least a first core and a second core. The restarting method includes actively monitoring an abnormality of the second core with the first core; passively monitoring an abnormality of the first core with the second core; and restarting the CPU in response to detection of the abnormality of the first core or the second core detected by one of the actively monitoring and the passively monitoring.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
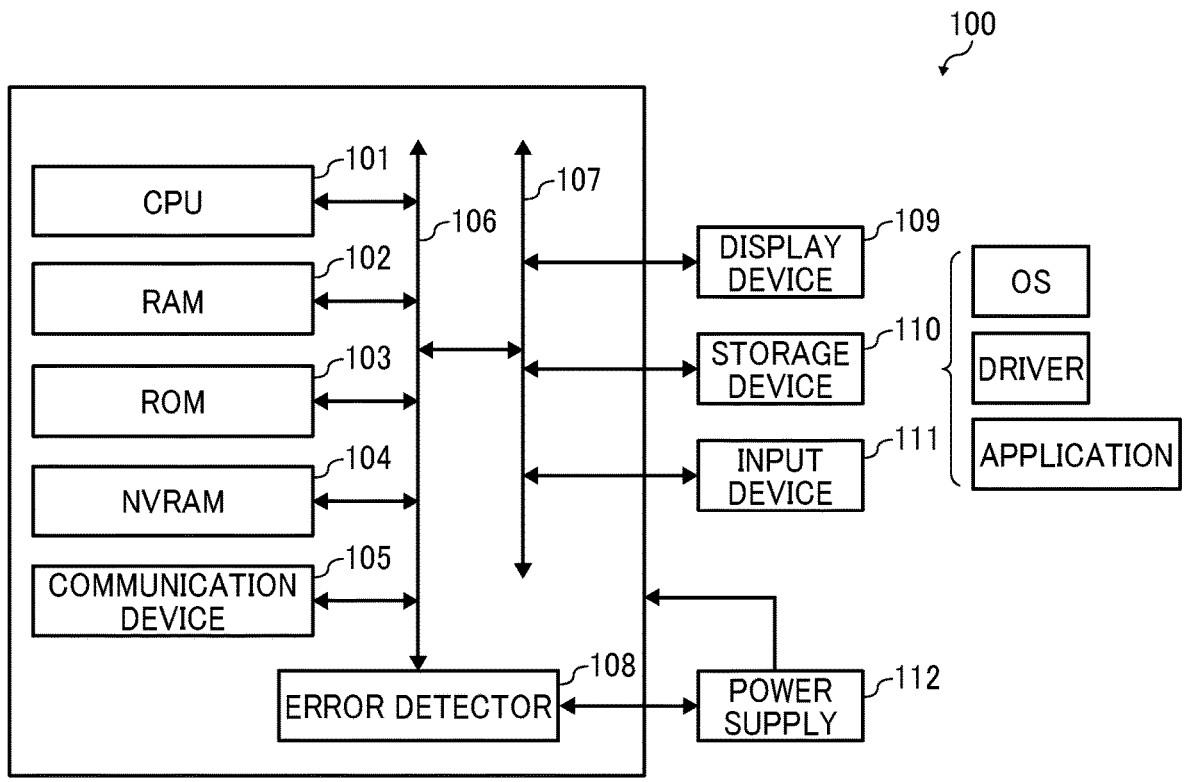
FIG. 1 is a diagram illustrating the hardware blocks of an electronic apparatus 100 according to this embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, while embodiments of the present disclosure will be described, the present disclosure is not limited to the embodiments to be described below. FIG. 1 illustrates the hardware blocks of an electronic apparatus 100 according to this embodiment. The electronic apparatus 100 illustrated in FIG. 1 will be described as an information processing apparatus, an image forming apparatus, an embedded apparatus, an in-vehicle apparatus, or an apparatus that can electronically and electrically operated using LSI. The electronic apparatus 100 according to this embodiment includes a CPU 101, a random access memory (RAM) 102, a read-only memory (ROM) 103, and a non-volatile random access memory (NVRAM) 104.

In this embodiment, the CPU 101 is a multi-core processor and executes a plurality of programs in parallel under operating systems that are independent for each CPU core. The RAM 102 reads a program called an operating system (OS) and provides an execution space required for the CPU 101 to execute various programs. In addition, the RAM 102 can provide an execution-time storage space storing data required for the CPU 101 to execute a program and the like.

The ROM 103 stores a basic input output system (BIOS), a bootstrap program, and other programs used for the CPU 101 to provide functions. At the time of starting the CPU 101 and at the time of the occurrence of an error or a stall in a CPU core, the CPU 101 reads a program according to this embodiment and can realize functions such as initial setting of hardware, starting an OS, and core checker. The hardware blocks described above are interconnected through system buses 106 and 107, and the operations of the hardware blocks are controlled according to a system clock.

The electronic apparatus 100 further includes the NVRAM 104 and a communication device 105. For example, in a case where the CPU 101 of the electronic apparatus 100 is restarted due to an error or a stall, the NVRAM 104 can provide a function of storing CPU data immediately before the restarting, for example, various kinds of data, a program counter, a register configuration, and the like. In a case where the CPU 101 is restarted due to an error or the like, in this embodiment, for example, the CPU 101 may be configured to efficiently reproduce a computation environment before the restarting by using data stored in the NVRAM 104.

The communication device 105 included in the electronic apparatus 100, for example, may be mounted to include a network interface card (NIC) and can connect the electronic apparatus 100 to other systems such as the Internet by using Ethernet (registered trademark), IEEE 802.x, LTE, Wifi, and the other communication bases.

In addition, the electronic apparatus 100 includes an error detector 108 connected to the system bus 106. The error detector 108 provides a function of processing an exception occurring when an error or a stall occurs in a core of the CPU 101 and, for example, the function may be implemented as one function of an interrupt handler. The output of the error detector 108 is input to a power supply (PSU) 112. The error detector 108 has a function of restarting the power supply 112 in a case where it is determined that an error or a stall occurs in the CPU 101 in accordance with this embodiment. In a case where the power supply 112 is restarted, the CPU 101 performs initial setting of cores of the CPU 101 according to a set post function and a bootstrap protocol and enables starting of an OS, starting of a core checker, starting of various applications, and the like.

Furthermore, the electronic apparatus 100 may be configured to include a display device 109, a storage device 110, and an input device 111 connected through a peripheral bus called a PCIe. The display device 109 provides a function of providing a liquid crystal display device, a touch panel, or any other user interface by using a standard such as VGA, XGA, or HDMI (registered trademark).

The storage device 110 may be configured to include a hard disk drive or an SSD and allows an OS, a driver, and an execution file of an application stored by the storage device 110 to be read by the CPU 101 so as to be used at a high speed by the CPU 101, for example, by using a communication protocol such as ATA, SATA, or USB.

The input device 111 may use a keyboard, a mouse, or a joystick and is used for inputting information or a direction to the electronic apparatus 100 from the outside. A touch panel enabling a tap, a swipe, and the like is a functional unit having both functions of the display device 109 and the input device 111.

The CPU 101 used in this embodiment may be configured as a multi-core processor and, for example, is a PENTIUM (registered trademark), a DUALCORE (registered trademark), a CORE2DUO (registered trademark), a CORE2QUAD (registered trademark), a CELERON (registered trademark) DUALCORE (registered trademark), an ATOM (registered trademark), a CORE2DUO (registered trademark), a CORE2QUAD (registered trademark), or a COREi (registered trademark) series, a XEON (registered trademark), a PENTIUM (registered trademark) compatible CPU having a multi-core configuration, a POWERPC (registered trademark), or a CPU referred as a so-called GPU but is not limited to the CPUs described above. In addition, an SH series (Renesas) or an OMAP family (Texas Instruments) used for a specific use or embedded control or any other multi-core CPU may be used.

Examples of an operating system (OS) to be used include real-time OS such as WindowsServer (registered trademark), UNIX (registered trademark), LINUX (registered trademark), Solaris (registered trademark), OPENBSD, CentOS, Ubntu, and eT-Kernel, MontavistaLinux (registered trademark) CGE, POSIX 1003. 1b, OSEK, ITRON, and any other appropriate OS. The CPU 101 can store and execute an application program described by a programming language such as an assembler language, C, C++, VisualC++, VisualBasic, Java (registered trademark), JavaScript (registered trademark), Perl, Ruby, or Python operating on the OS described above.

Figure 2:
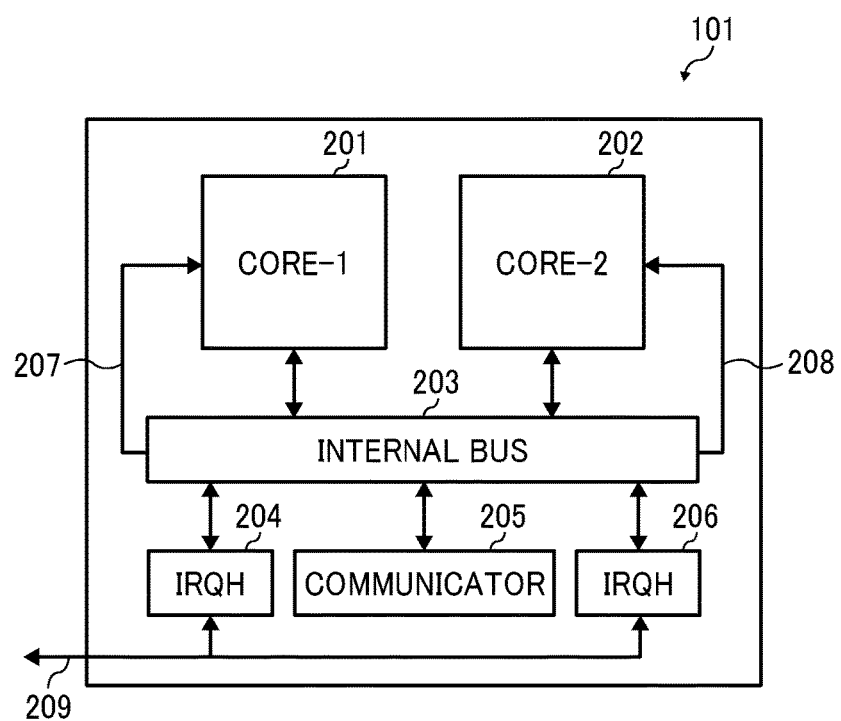
FIG. 2 is a block diagram illustrating an exemplary internal structure of a CPU 101 according to this embodiment.

FIG. 2 is a block diagram illustrating an exemplary internal structure of the CPU 101 according to this embodiment. The CPU 101, in the embodiment illustrated in FIG. 2, is implemented as a two-core CPU architecture equipped with cores 201 and 202. Hereinafter, the core 201 will be referred to as a core-1, and the core 202 will be referred to as a core-2. The core-1 and the core-2 are connected to each other through an internal bus 203 connecting the inside of the CPU 101, and mutual information can be used.

In addition, in the internal bus 203, an interrupt handler IRQH 204 controlling an interrupt, which is transmitted from an interrupt input 209, to the core-1 and an interrupt handler IRQH 206 controlling an interrupt to the core-2 are included. The IRQHs 204 and 206 control an interrupt common to the core-1 and the core-2 and functions as a notification unit (notification means) to notify abnormalities of the core-1 and the core-2 to the outside and a restarting unit (restarting means) to restart the CPU 101.

In addition, the CPU 101 includes a communicator 205. The communicator 205 configures a communicator between cores according to this embodiment and enables inter-core communication between core-1 and the core-2 through the internal bus 203. In addition, a unit for notifying an abnormality of the CPU 101 to the outside may be not an interrupt signal but a signal transmitted through a data pin of the CPU 101.

The communicator 205 provides a function of receiving information including a message, a destination address, and a transmission source address from the core-1 or -2 and allowing the message to be acquired by a core-1 or -2 of a transmission destination through interrupt lines 207 and 208, thereby realizing inter-core communication. In addition, the number of cores configuring the CPU 101 according to this embodiment is not limited to two, but four cores, eight cores, sixteen cores, or the like may be appropriately used according to required characteristics.

Figure 3:
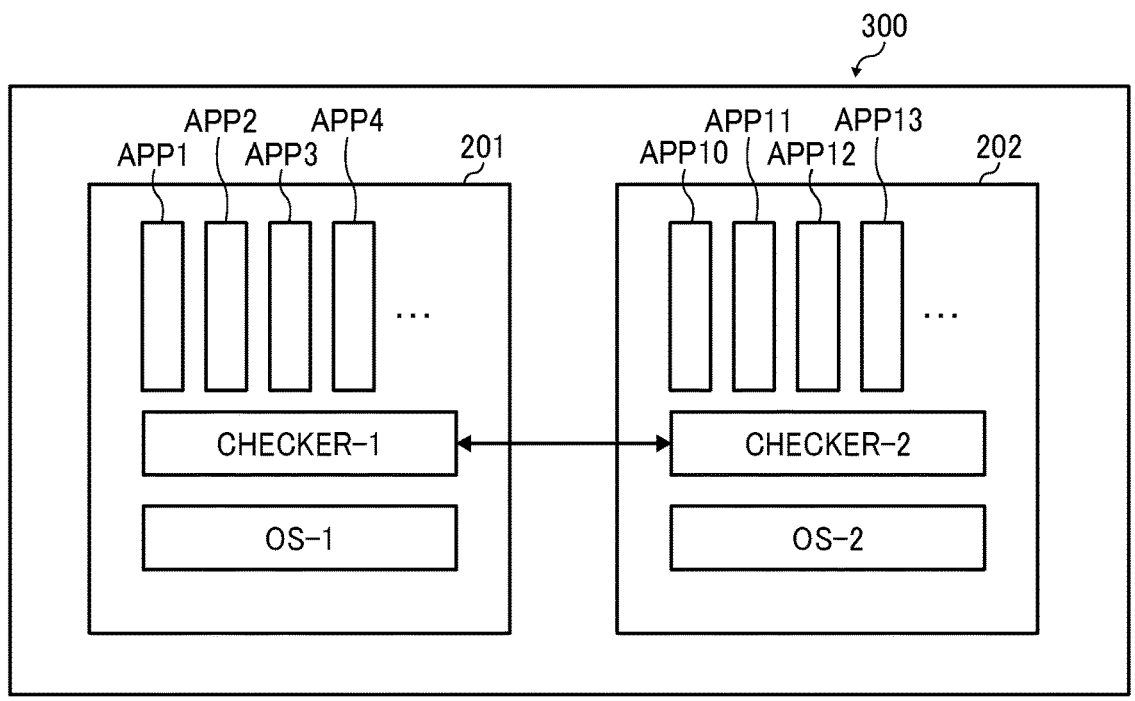
FIG. 3 is a diagram illustrating a software block 300 of the CPU 101 according to this embodiment.

FIG. 3 is a diagram illustrating a software block 300 of the CPU 101 according to this embodiment. Each software block is a functional block realized on the CPU 101 as each core of the CPU 101 reads software into a RAM or a ROM and expands an execution code inside the core of the CPU 101. In the core 201, an OS-1 is installed, and a checker program-1 (hereinafter, referred to as a checker-1) according to this embodiment and other application programs 1 to 4 and so on operate on the OS-1.

In addition, in the core 202, an OS-2 is installed, and the checker-2 and other application programs, such as application programs-10 to -13 and so on operate on the OS-2. Here, the OS-1 and the OS-2 may be either the same or different from each other. For example, the OS-1 may be UNIX (registered trademark), and the OS-2 may be mounted as a real-time OS, but the combination is not particularly limited to this combination. For example, the core 201 corresponds to a first core according to this embodiment, and the core 202 corresponds to a second core according to this embodiment.

In this embodiment, the checker-1 and the checker-2 provide a function for mutual monitoring of the core-1 and the core-2. For example, in this embodiment, the checker-1 of the core 201 functions as an active monitoring unit (active monitoring means) to actively check the operation of the checker-2 of the core 202. For example, the checker-1 has a function of regularly polling a message for the checker-2 of the core-2. On the other hand, the checker-2 of the core 202 has a function of responding to the checker-1 in a case where polling is received from the checker-1. In addition, the checker-2 provides a function of monitoring the interval of polling from the checker-1, passively determines that there is no polling from the core-1, and configures a passive monitoring unit as passive monitoring means for the core-1.

In other words, in this embodiment, one checker is mounted for each core. One of checkers of the cores, for example, the checker-1 of each core is configured to function as an active monitoring unit (active monitoring means) for the other cores. The checker-1 monitors a response from a polling destination as a result of the polling and has a function of determining an error or a stall of the core in the polling destination when there is no response for a first predetermined period of time, for example, a total of 5 to 10 seconds.

In contrast to this, in the embodiment to be described, the checker-2 of the core-2 functions as passive monitoring for the core-1. More specifically, the checker-2 determines that an error or a stall has occurred in the checker-1, in other words, the core-1 in a case where a polling message from the core-1 is not received over a second predetermined period of time.

In this embodiment, in a case where an error or a stall occurs in one of the core-1 and the core-2, a core of the side on which an error or a stall has not occurred generates an error generation interrupt and notifies the error detector 108 of the occurrence of the error or the stall. When the interrupt is detected, the error detector 108 resets the power supply 112 to start restarting of the CPU 101.

In addition, while a case may be considered in which errors or stalls have occurred in both the core-1 and the core-2, in this embodiment, the core-1 and the core-2 are described to perform independent processes under independent OS's, and thus, simultaneous errors or stalls will be described not to occur other than in the case of a malfunction of the CPU 101.

Figure 4:
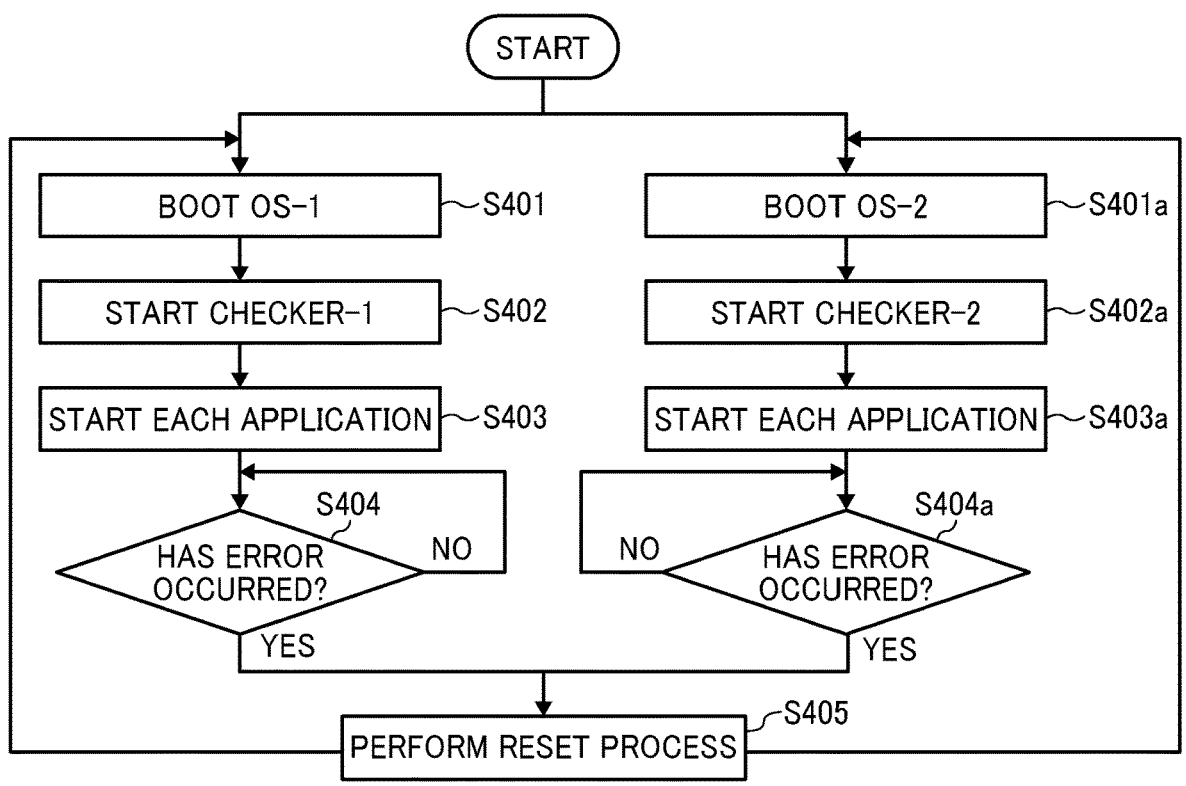
FIG. 4 is a flowchart illustrating a restarting method of the CPU 101 according to this embodiment.

FIG. 4 is a flowchart illustrating a restarting method of the CPU 101 according to this embodiment. The process illustrated in FIG. 4 starts from step S400 and is performed to include parallel steps of S401 to S405 and S401a to S405 corresponding to the number of cores. However, a reset process of step S405 is performed in a stage in which a sound core determines that an error or a stall has occurred in at least one core.

As described above, since the process of FIG. 4 is performed in parallel in correspondence with the number of cores, steps S401 to S405 corresponding to the core-1 will be described, and the other processes will not be described. In step S401, according to a bootstrap protocol, after post checking and the like are performed, the OS-1 is booted. In step S402, the program of the checker-1 is loaded, and the checker-1 is started. Thereafter, in step S403, each application program is started, and the service of the core-1 is started.

In step S404, it is determined whether or not an error has occurred in the other core. In a case where an error has occurred (Yes), the process branches to step S405, the process is returned to steps S401 and S401a, and a restarting process is started from a bootstrap process. On the other hand, in a case where no error has occurred (No), the occurrence of an error is continuously checked in step S404. Hereinafter, an error checking process performed in step S404 according to this embodiment will be described with reference to FIGS. 5 to 7.

Figure 5:
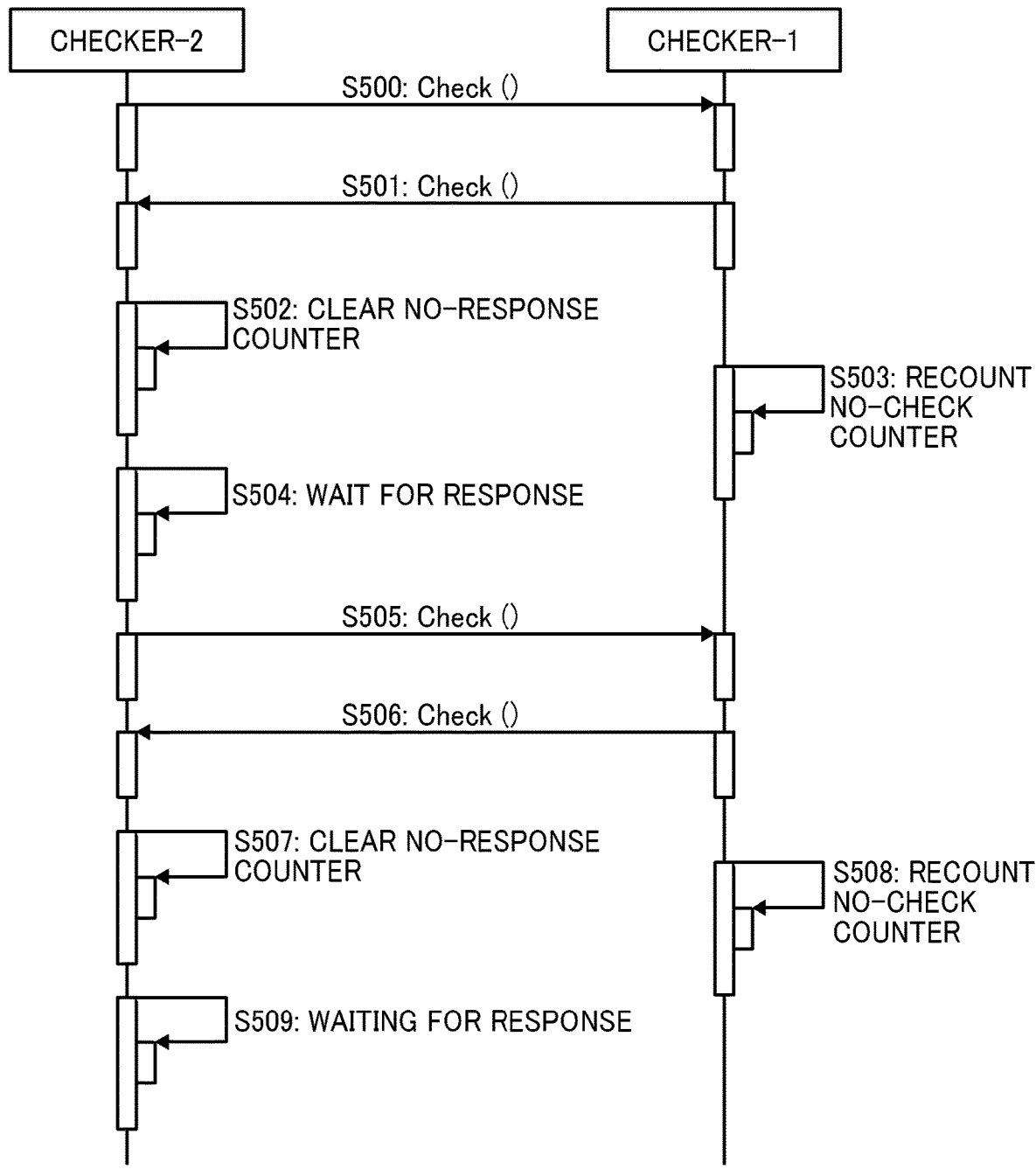
FIG. 5 is a sequence diagram of an error checking process according to this embodiment.

FIG. 5 is a sequence diagram of the error checking process according to this embodiment. In FIG. 5, a checker-2 will be described as an active monitoring unit (active monitoring means), and a checker-1 will be described as a passive monitoring unit (passive monitoring means). The checker-2 performs polling for the checker-1 in step S500. The checker-1 that has received the polling returns a response in step S501.

The checker-2 that has received the response clears a no-response counter in step S502. Then, on the checker-1 side, after no-check counter is cleared, recounting is started in step S503. According to a series of these processes, the time axis of checking is reset from steps S502 and S503.

The checker-2 waits for a response along the new time axis in step S504 and, in step S505, performs polling for the checker-1 in accordance with the arrival of the polling timing. The checker-1 that has received the polling returns a response in step S506. Thereafter, the checker-2 continues checking in the following time axis in steps S507 and S509. Then, on the checker-1 side, after the no-check counter is cleared, recounting is started in step S503.

Figure 6:
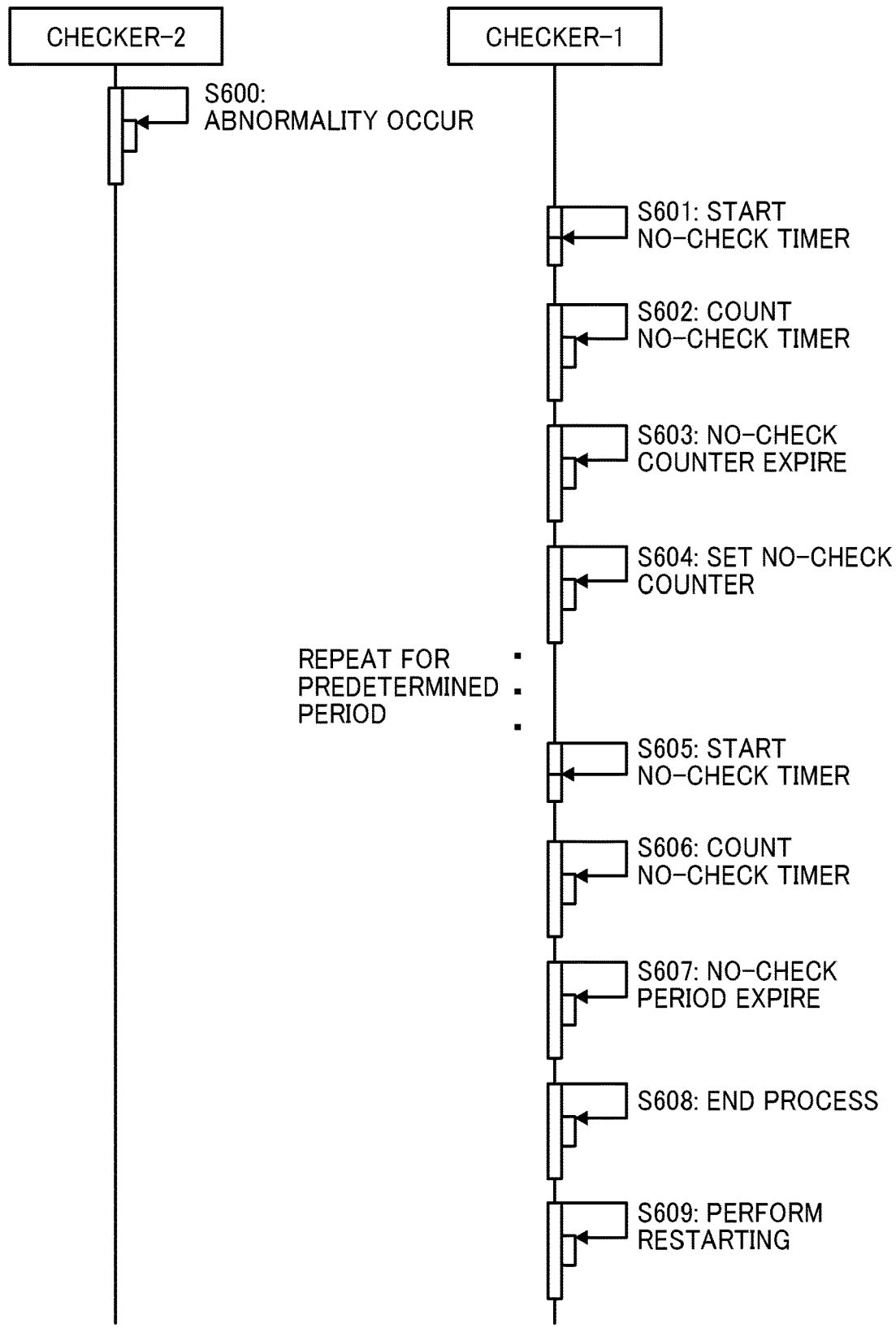
FIG. 6 is a sequence diagram of an error checking process of a case where an abnormality occurs in a checker-2 that is an active monitoring unit.

The process illustrated in FIG. 5 is continued until an error or a stall occurs in the core-1 and the core-2. A process performed in a case where an error or a stall occurs in a core will be described with reference to FIGS. 6 and 7. FIG. 6 assumes a case where an abnormality such as an error or a stall occurs in the checker-2 that is an active monitoring unit (active monitoring means) in step S600. Thereafter, a core-2 mounting the checker-2 malfunctions.

The checker-1 that is a passive monitoring unit (passive monitoring means) starts the no-check timer in step S601 and performs count-up (or count-down) of the no-check timer in step S602. When the no-check counter expires in step S603, the no-check counter is reset in step S604, and an accumulated period of time of no check is repeatedly counted in steps S601 to S603. Here, the accumulated period of time and the number of repetitions may be set as are required for an apparatus to be controlled by the electronic apparatus 100. The accumulated period of time, for example, is several hundreds of ms to several tens of ms, and more preferably, 1 s to 10 s. However, the accumulated period of time is not limited to such a period of time.

The checker-1 repeats counting for a predetermined period of time after that and, when the accumulated period of time set for a period of time in which polling from the checker-2 is ceased expires in step S607, an end process is started in step S608. Examples of the end process of step S608 include a process of saving the state of the cores in the NVRAM 104, a process of stopping the rotation of a hard disk device, and other processes. When the process of step S608 is completed, the core of the checker-1 generates an error signal and starts a restarting process in step S609.

According to the process described above, even in a case where the active monitoring unit malfunctions, the malfunction of the core can be checked by the passive monitoring unit alone.

Figure 7:
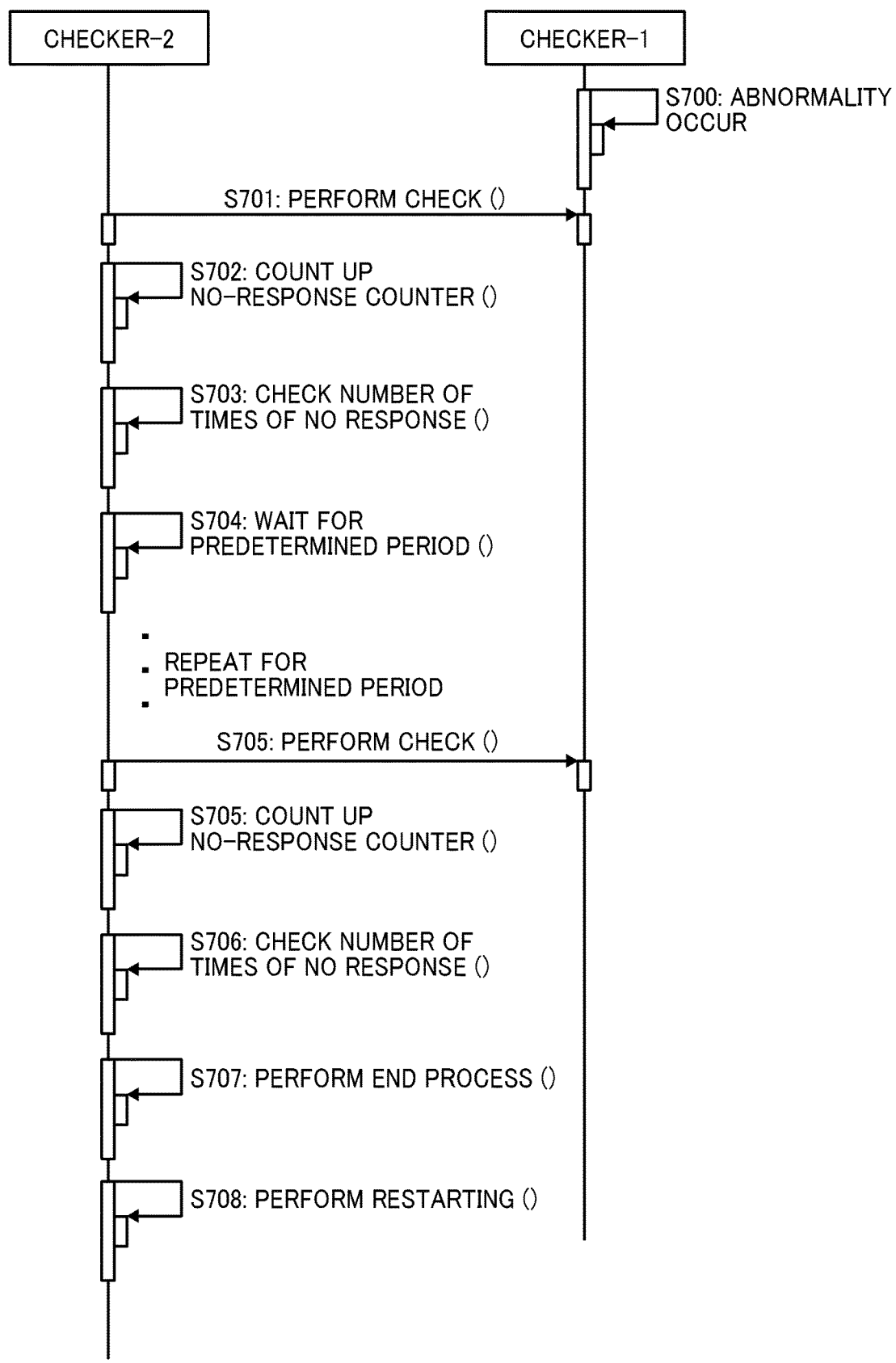
FIG. 7 is a sequence diagram of an error checking process of a case where an abnormality occurs in a checker-1 that is a passive monitoring unit, contrary to the case illustrated in FIG. 6.

FIG. 7 is a sequence diagram of an error checking process of a case where an abnormality occurs in a checker-1 that is a passive monitoring unit, contrary to the case illustrated in FIG. 6. It is assumed that an abnormality occurs in a core-1, and the core-1 malfunctions in step S700. A checker-2 issues polling for checking to a checker-1 in step S701 and starts counting a no-response period by performing up-counting (may be down-counting in another embodiment) of the no-response counter in step S702.

At this time, since the core-1 cannot respond due to a malfunction, the checker-2 checks the number of times of having no response in step S703 and, in this embodiment, the number of times of having no response has not arrived at a set number of times, and thus, the checker-2 waits for a predetermined period of time in step S704. This is repeated for a predetermined period of time.

Thereafter, polling is performed again in step S705, and the no-response counter is up-counted in step S705. However, since an abnormality occurs in the core-1, there is no response, and accordingly, it is determined that the number of times of having no response has arrived at the set number of times in the no-response time checking process of step S706.

In step S707, the core-2 starts an end process, and, after the end process is completed, a restarting process is started in step S708, and the core-1 and the core-2 are restarted through a bootstrap process, and the operation of the CPU 101 is normalized.

Second Embodiment

Here, a second embodiment will be described. In the first embodiment, a form for solving a case where a fatal error of the CPU core occurs, and the CPU core in which the error has occurred cannot perform a subsequent process has been described. The second embodiment to be described below has a form in which, in a state in which a CPU core is sound, in a case where an error or a failure occurs in an application operating on the core, by resetting the CPU 101 to avoid a CPU error or an abnormal operation of the system in the future, recovery from the error state is performed.

Figures 8, 9:
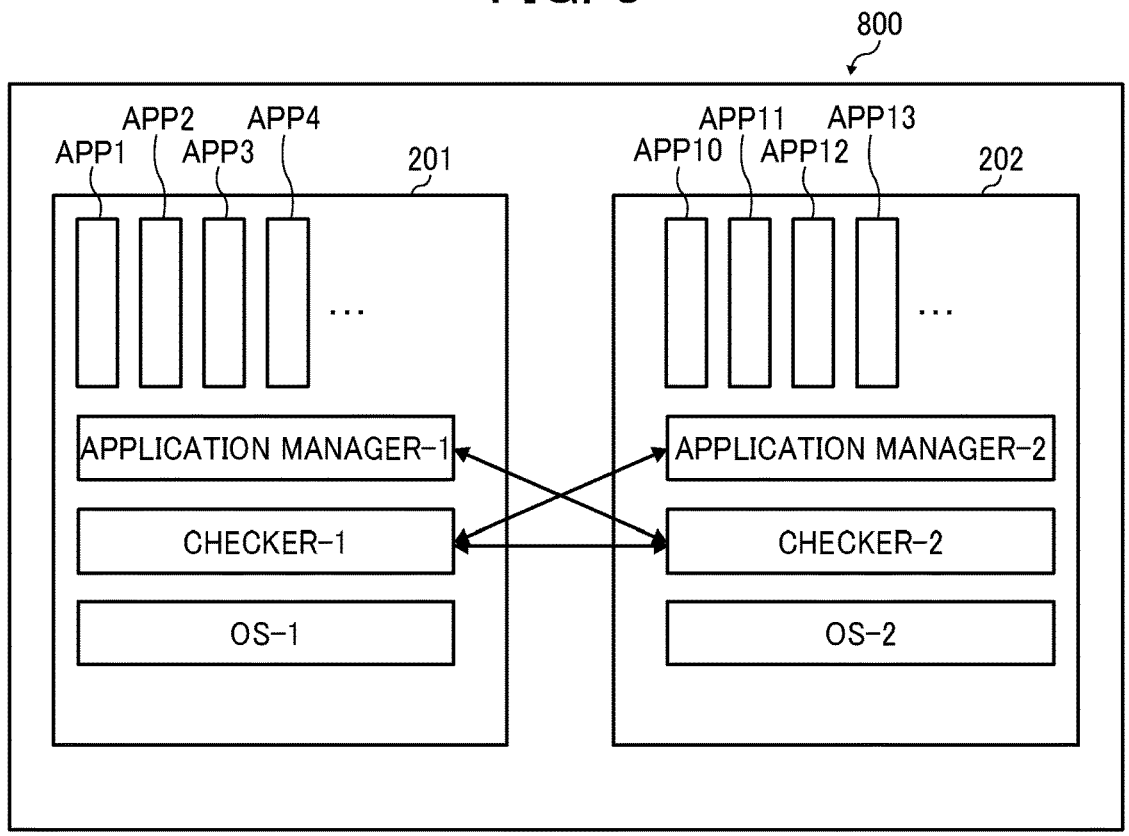
FIG. 8 is a diagram illustrating an embodiment of a case where the CPU 101 according to this embodiment has not two cores but four cores.
FIG. 9 is a diagram illustrating an execution list 900 according to this embodiment.

FIG. 8 is a diagram illustrating functional blocks 800 of software mounted to a CPU 101 according to the second embodiment. The functional blocks illustrated in FIG. 8 are realized as functional units on the CPU 101 as the CPU 101 executes software. In the embodiment illustrated in FIG. 8, while a core 201 is described to operate RTOS as an OS-1, and a core 202 is described to operate LINUX (registered trademark) or UNIX (registered trademark) as an OS-2, it is apparent the core 201 may operate an OS such as LINUX (registered trademark) or UNIX (registered trademark).

The core 201 mounts the OS-1, a checker-1, and an application manager-1. The OS-1, similar to the first embodiment, controls the operation of the core 201, and the checker-1 performs checking of the core 202. In addition, in the second embodiment, the checker-1 also functions as a restart requesting unit (restart request means) to request the other core (in this embodiment, the core 202) to perform restarting. The application manager-1 registers various applications App1 to App4 and so on operating on the core 201 and manages an execution list in which the possibility of immediate end and a sequence for an end process performed in case where immediate end is not appropriate are registered.

Each of the applications App1 to App4 and so on issues a notification corresponding to the execution state, for example, a notification having various contents to the OS or the application manager in accordance with an attribute of the OS. For example, the application manager-1 operating on the OS-1 mounted as RTOS receives notifications of failures of the applications from the applications App1 to App4. Thereafter, the application manager-1 notifies the checker-2 of the core-2 that the core-1 is to be reset.

The core 202, similar to the core 201, executes a plurality of software, and the OS-2 controls the operation of the core 202. The checker-2 performs checking of the core 201 and, in the second embodiment, also functions as the restart requesting unit (restart request means) to request the other core (in this embodiment, the core 201) to perform restarting. In the embodiment to be described, the OS-2 manages various applications, such as the applications App10 to App13 and so on operating on the core 202 and receives notifications relating to the execution states from the applications App10 to App13 and so on.

When a notification representing that any one of the applications App10 to App13 and so on has a failure is received from the applications App10 to App13 and so on, the OS-2 transmits an identification value of the application to the application manager-2 and notifies the checker-1 of the core-1 that the core-2 to be to be reset through the application manager-2. The application according to this embodiment corresponds to a notification unit serving as notification means to notify the OS or the application manager of the occurrence of a fault process.

A plurality of applications, for example, are executed in parallel, for example, using pipeline processing or the like, and, when an abnormality occurs in one of the applications, the execution of subsequent processes is meaningless, and such an abnormality may have a significant influence on the operation of a built-in system in which the CPU 101 is used. For this reason, in the second embodiment, the execution states of the applications App1 to App4, App10 to App13, and so on are managed, and, when a failure in the execution of the application is detected from the status information, the OS notifies the other core that the OS is to be reset through the application manager-1 and the application manager-2. By applying this process, the CPU 101 is reset with the influence on the operation of the core of the normally-operating side minimized, and the whole CPU 101 can be returned to a normal state.

In other words, the CPU 101 illustrated in FIG. 8 operates a plurality of the cores 201 and 202, and thus, when the CPU 101 is suddenly reset in a case where a failure occurs in the application App1 operating in the core 201, a job executed by the core 202 is reset, and the control of various devices controlled by the CPU 101 ends regardless of the states of the devices. In such a case, the devices perform unpredictable operations, and thus, the whole CPU 101 cannot be immediately reset according to the occurrence of a failure of the application in the core 201.

For this reason, in the second embodiment, for example, in a case where a failure of an application of the core 201 occurs in the core 201, the application manager-1 of the core 201 issues a reset plan used for notifying that the core 201 is to be reset to the checker-2 of the core 202. When a reset plan is received, the checker-2 of the core 202 ends applications that are managed by the checker-2 in an appropriate sequence and performs an end process including a core dump process of saving the execution state data into a memory and the like, notifies the checker-1 of the core 201 of the completion of reset preparation, and starts a reset process using the checker-1.

Similarly, the application manager-2 of the core 202 performs a similar process and, in a case where a failure of an application executed by the core 202 occurs, notifies the core 201 of the occurrence, and waits for reset permission from the core 202. In addition, during this waiting period, the core 202 may perform a process of saving execution-time data and an execution state and the like. As above, in the second embodiment, since a problem in the operations of the cores 201 and 202 is not caused, the checker-1 or the checker-2 receives a notification from the application manager-1 or the application manager-2 and starts a reset process.

For this reason, in the second embodiment, the occurrence of an error directly relating to a stall of a core having the possibility of an occurrence in the future is prevented in advance and enables efficient resetting of the system with an influence on the apparatus minimized.

In other words, each of the checker-1 and the checker-2 according to the second embodiment has, in addition to the function of checking the core states of the other CPU, has a function of checking the state of application programs in the own CPU core and notifying the checker of the other CPU core of restarting. Examples of a failure of an application program include but are not limited to a scheduling violation, a memory protection violation, an exclusive control violation, and the like.

FIG. 9 is a diagram illustrating an execution list 900 of an application mounted by the application manager-1 of the core 201. The execution list 900 and the application manager-1 correspond to a removing unit (as removing means) according to this embodiment. The execution list 900 illustrated in FIG. 9 is configured to be added when the execution of an application is started and removed when the execution of the application ends.

In the execution list, a list of objects designating end sequences at the time of forced end is associated with applications App1 to App4. For example, in a case where the application App1 is to be forcedly ended, the application App1 has an attribute of ending without influencing the other applications or external apparatuses, and accordingly, an object kill is called, and an end process is immediately performed.

On the other hand, the application App2 relates to any other process or controls an application driving an external apparatus. Thus, in order to appropriately stop the application App2, a relating process is required to be ended, and the state of the external apparatus is required to be managed and controlled. For this reason, as an end sequence associated with the application App2, an object shutdown2 including commands ending various processes in a stepped manner and then finally instructing the end of the application App2 is registered.

Described in more details, it is assumed that the application manager-1 receives a notification of the occurrence of a fault process in the Application App2 from the OS-1. At this time, when the application App2 is immediately ended, for example, in a case where an external apparatus is operated, there is a possibility of uncontrollability. When an abnormality of the application App2 is notified, the application manager-1 calls an object shutdown2 describing an immediate end sequence, thereby performing a process of normally stopping the external apparatus or the other processes.

The object shutdown2 ends the process according to the sequence and, in order to end the application App2 on a final stage, for example, performs a process of generating a kill signal. This process is repeated until all the processes (applications) are ended. For this reason, all the processes operated by the core 201 and furthermore, external apparatuses are ended before the resetting of the CPU 101 without causing any trouble.

Figures 10, 11:
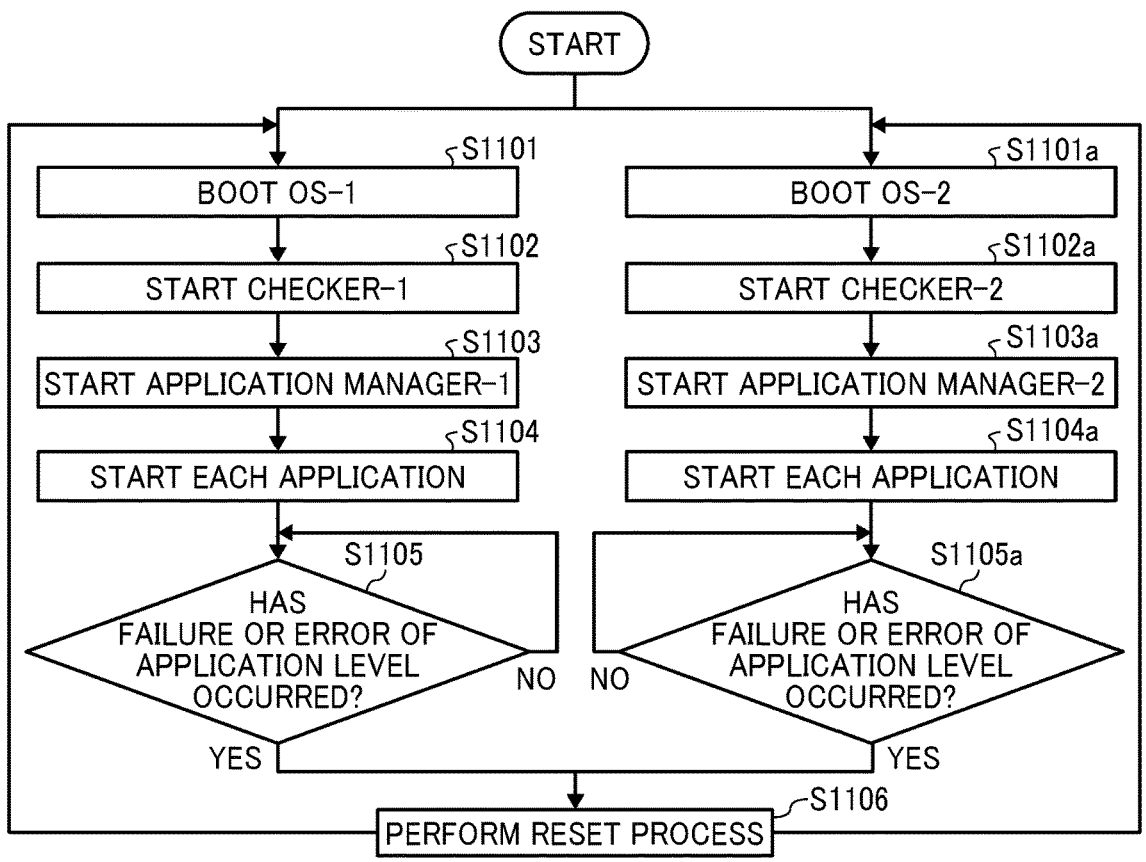
FIG. 10 is a diagram illustrating an execution list 1000 according to this embodiment.
FIG. 11 is a flowchart of a method of restarting a CPU 101 according to a second embodiment.

FIG. 10 illustrates an embodiment of an execution list 1000 mounted in the core 202. In this embodiment, the execution list 1000 and the application manager-1 correspond to a releasing unit (as removing means) according to this embodiment. It will be assumed that applications App10 to App13 are in the middle of execution in the core 202 in the description. In this embodiment, the applications App12 and App13 are processes permitted to be immediately ended, and, when the occurrence of a fault is notified from the checker-2, objects kill12 and kill13 are respectively called, and immediate end processes are performed.

On the other hand, the applications App10 and App11 are processes providing data to other processes or controlling external apparatuses, and accordingly, in order to appropriately end the applications, the applications are required to be ended in a sequence according to an object. For this reason, in a case where fault processes occur in the applications App10 and App11, objects shutdown10 and shutodown11 are called, and end sequences are started. While the contents of the end sequences are dependent on the application, the end sequence may be configured similar to the process described with reference to FIG. 9.

In the cases illustrated in FIGS. 9 and 10, for the convenience of description, the execution lists 900 and 1000 have been described to be mounted, any other form may be used, and each application may be implemented to include the end sequence in advance. In the case of the embodiment, a fault end notification used by the application manager-1 or the application manager-2 for notifying the end to the application or the process performing a fault process, for example, may be configured to be transmitted as a signal.

In this embodiment, while a language describing the end sequence is not particularly limited, from the viewpoint of controlling a primary process of the system, for example, a C language, a shell script, or a code combining the C language and the shell script may be used.

In addition, as another embodiment, an execution permission time of each of applications registered in the execution list 900 or the execution list 1000 may be set, and, in a case where a corresponding application is not removed over the set time, a failure is regarded to occur in the application, and the end sequence of the application may be started.

FIG. 11 illustrates a flowchart of a method of restarting the CPU 101 according to the second embodiment. The process illustrated in FIG. 10 is started from step S1100 and is performed to include parallel steps of S1101 to S1106 and S1101a to S1106 that correspond to the number of cores.

In the second embodiment, the reset process of step S1106 is performed, in step S1105 or step S1105a, in (1) a stage in which the sound core side determines that an error or a stall has occurred in at least one core and (2) a stage in which a failure occurs in an application manager at the application level, and the CPU core of the sound side completes preparation for the reset. As described above, the process illustrated in FIG. 10 is similar to the process illustrated in FIG. 4 except for processes of steps S1105 and S1105a, and thus, a further detailed description will not be presented.

Figure 12:
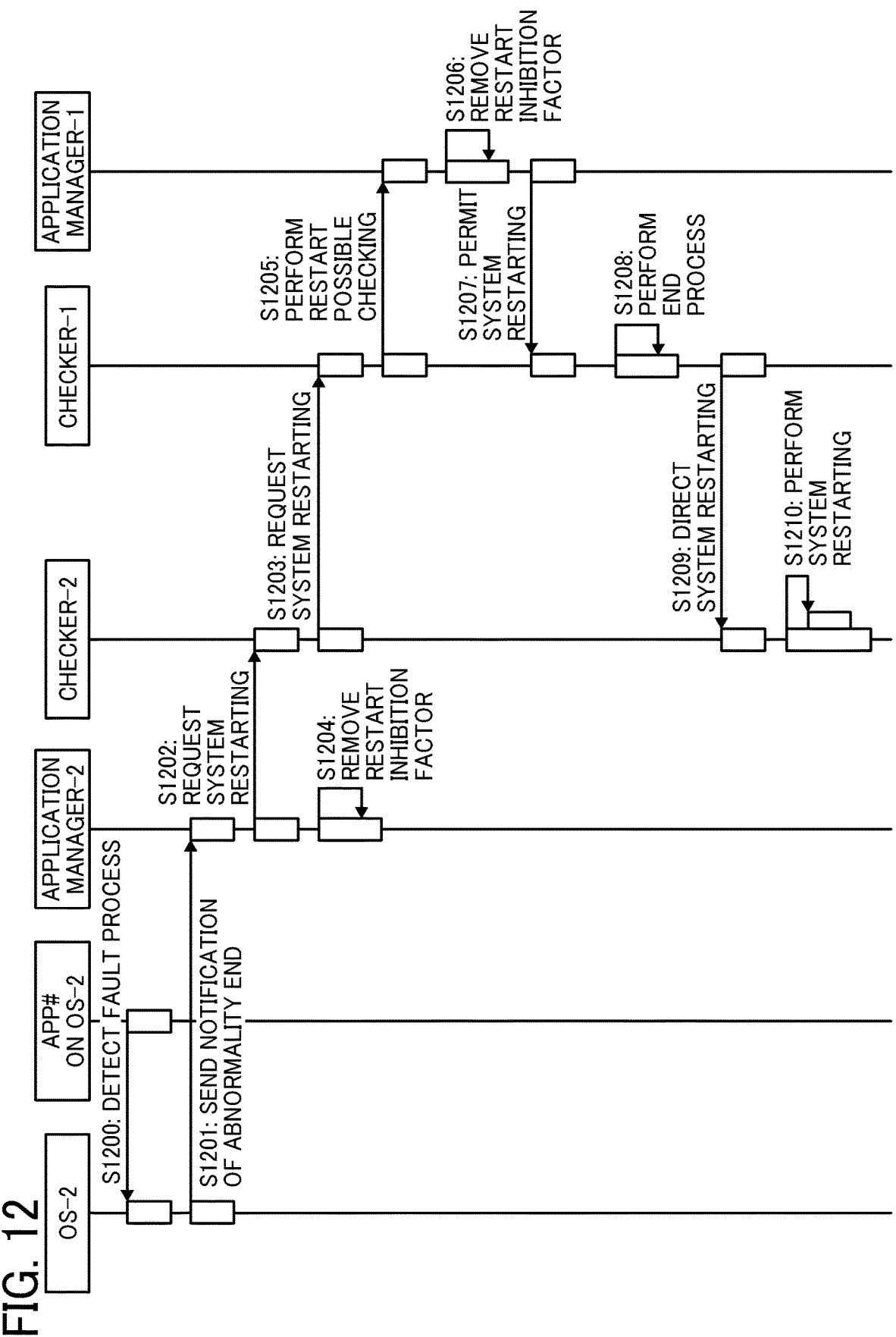
FIG. 12 is a sequence diagram of an error checking process of a case where an abnormality occurs in an application executed by a core 202.

FIG. 12 is a sequence diagram of a reset process according to this embodiment. In the case illustrated in FIG. 12, a failure of the application will be described to occur in a core 202 operating an OS-2. In the embodiment to be described, the OS-2 will be described as UNIX (registered trademark) or an OS having compatibility with UNIX.

In step S1200, the OS-2 monitors the execution states of application programs and, for example, receives notifications from the application programs, for example, as signals. The OS-2 inspects the notifications and, in a case where a notification is determined to inhibit normal execution of the application, determines that a failure such as a fault process occur in an application App # (here, # is an integer of "1" or more) operating on the OS-2.

In step S1201, the OS-2 notifies the occurrence of abnormal end in the detected application to the application manager-2 of the OS-2. When the notification is received, the application manager-2 issues a system restart request to the checker-2 in step S1202. The application manager-2, in step S1204, for example, calls an object executing an end sequence assigned to the corresponding application and performs a process of removing a factor inhibiting the restart of the application executed under the management of the OS-2.

For example, as the factor, in a case where there is an application controlling an external apparatus, there is a process of forced end of the application, checking of the starting and ending of an application used for performing a process of ending the external apparatus corresponding to the forced end, and the like. In addition, in a case where an executed process is of a type that can be re-performed in a time series, the factor includes saving of the execution-time status and the execution-time data into a memory and the like.

Meanwhile, when the application manager-2 starts a restart inhibition factor removing process, the checker-2 issues a notification representing the system is to be restarted to the checker-1 of the core-1 as a system restart request in step S1203. When the notification is received, the checker-1 of the OS-1 issues a restarting possible checking notification to the application manager-1 in step S1205. The checker-1 that has received the restarting possible checking notification issues a restarting possible checking notification to the application manager-1 and performs the checking of the execution list using the application manager-1. Thereafter, the core-1 performs an end sequence corresponding to the application that is in the middle of execution in step S1206, thereby performing removing of the restart inhibition factor.

For example, when it is checked that the entry of the execution list 900 managed by the application manager-2 is empty, the application manager-2 issues a system restart permission to the checker-1 in step S1207. After performing a process for a normal end of the core 201 called a core dump in step S1209, the checker-1 issues a system restart direction permitting system restart to the side of the core 202 on which a fault process has occurred in step S1209.

When the notification is received, the checker-2 of the core 202 starts a system restart process in step S1210. At this point, the external apparatus and the core 201 normally end, and accordingly, the core 202, for example, performs restart of the CPU 101 by causing the CPU 101 to start a bootstrap process by the authority of the core 202, whereby a trouble according to a fault process can be automatically resolved.

An embodiment illustrated in FIG. 12 is an embodiment of a case where a fault process occurs in an application executed by the core 202 executing a full-size OS such as UNIX (registered trademark), LINUX (registered trademark), or Solaris (registered trademark).

Figure 13:
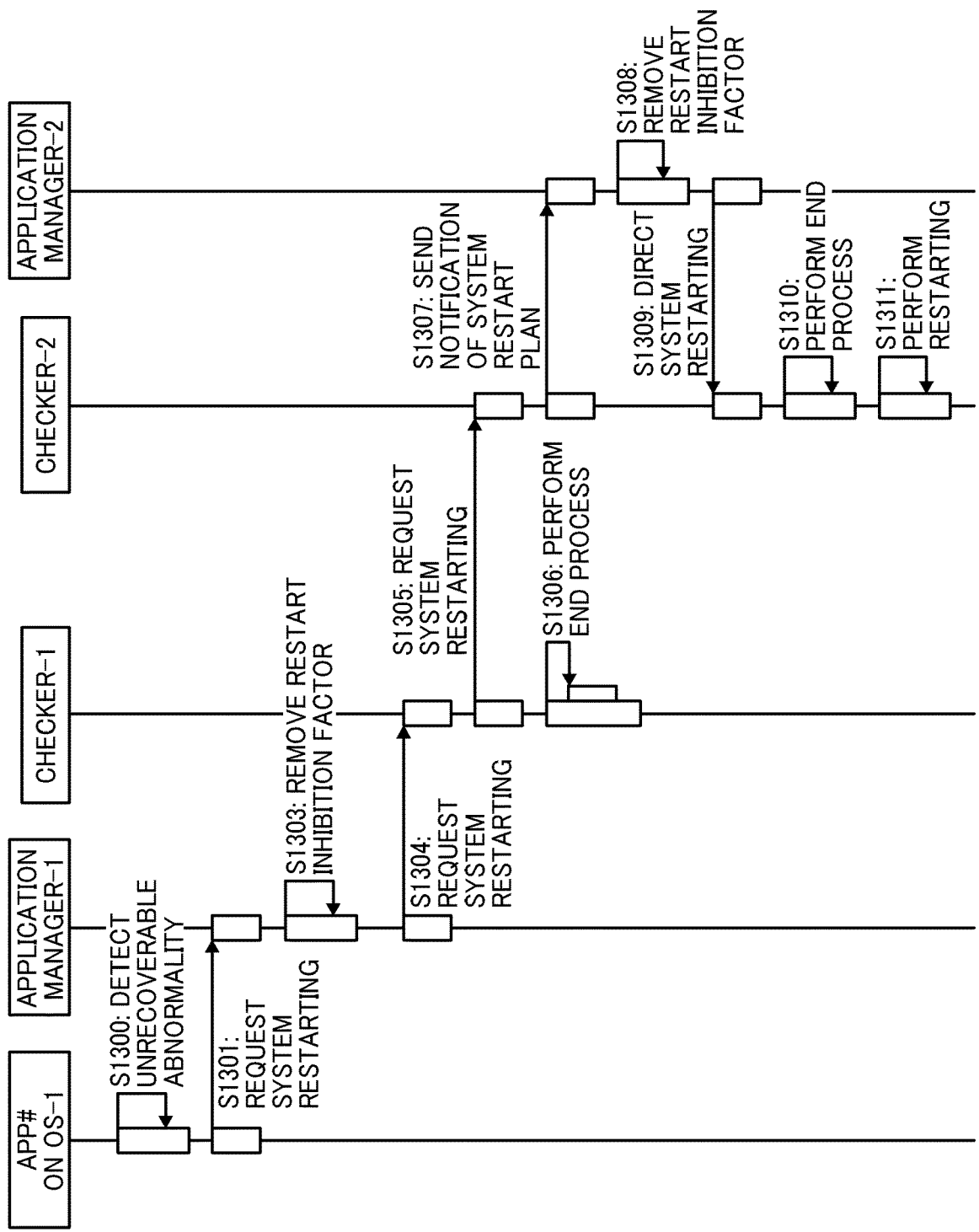
FIG. 13 is a sequence diagram of an error checking process of a case where an abnormality occurs in an application executed by a core 201.

FIG. 13 illustrates a processing sequence of a case where a fault process occurs in an application executed in a core 201, for example, mounting RTOS called POSIX (registered trademark). Compared to a full-size OS such as UNIX (registered trademark), RTOS has predetermined restrictions on the library configuration and the like and requires real-time processing and thus, performs a fault responding process having promptness higher than the promptness of the process illustrated in FIG. 12.

In the process illustrated in FIG. 13, an application executed by an OS-1 is assumed to detect an unrecoverable abnormality in step S1300. Examples of the unrecoverable abnormality include but are not limited to memory inaccessibility, a failure in calling a privileged process, reception of a fault data, or standby timer expiration at the application level except an underflow and an overflow that are fatal exception violations.

The application that has detected the abnormality issues a system restart request to the application manager-1 in step S1301. When the request is received, the application manager-1 calls an object for executing an end sequence designated in the execution list 900 and executes the end sequence so as to remove a restart inhibition factor in step S1302. After all the processes ends, the application manager-1 issues a system restart request to the checker-1 in step S1304.

The checker-1 that has received the system restart request issues a system restart request to the checker-2 of the core 202 in step S1305 and immediately thereafter, performs an end process of the core 201 in step S1306. Meanwhile, the checker-2 that has received the system restart request issues a system restart advance notification to the application manager-2 in step S1307. The application manager-2 that has received the notification calls an end object of an application registered in the execution list 1000 and executes the end sequence for all the applications in step S1308.

After the end, a system restart direction is issued to the checker-2 in step S1309. When the direction is received, the checker-2 performs the process of a core dump and the like in step S1301 and starts a bootstrap process, for example, by the authority of the core 202 in step S1311, whereby the CPU 101 is restarted, and a trouble according to a fault process can be automatically resolved.

As described with reference to FIGS. 12 and 13, since the restarting (rebooting process) is performed by the core in which the full-size OS is mounted, for example, also at the time of restarting, the setting of the RTOS can be appropriately restarted. In addition, while both the cores 201 and 202 may mount full-size OS's, in such a case, by employing a form in which a core of a side, in which the application does not perform a fault process, performs a final rebooting process, the end process and the rebooting process can be performed more reliably.

Figure 14:
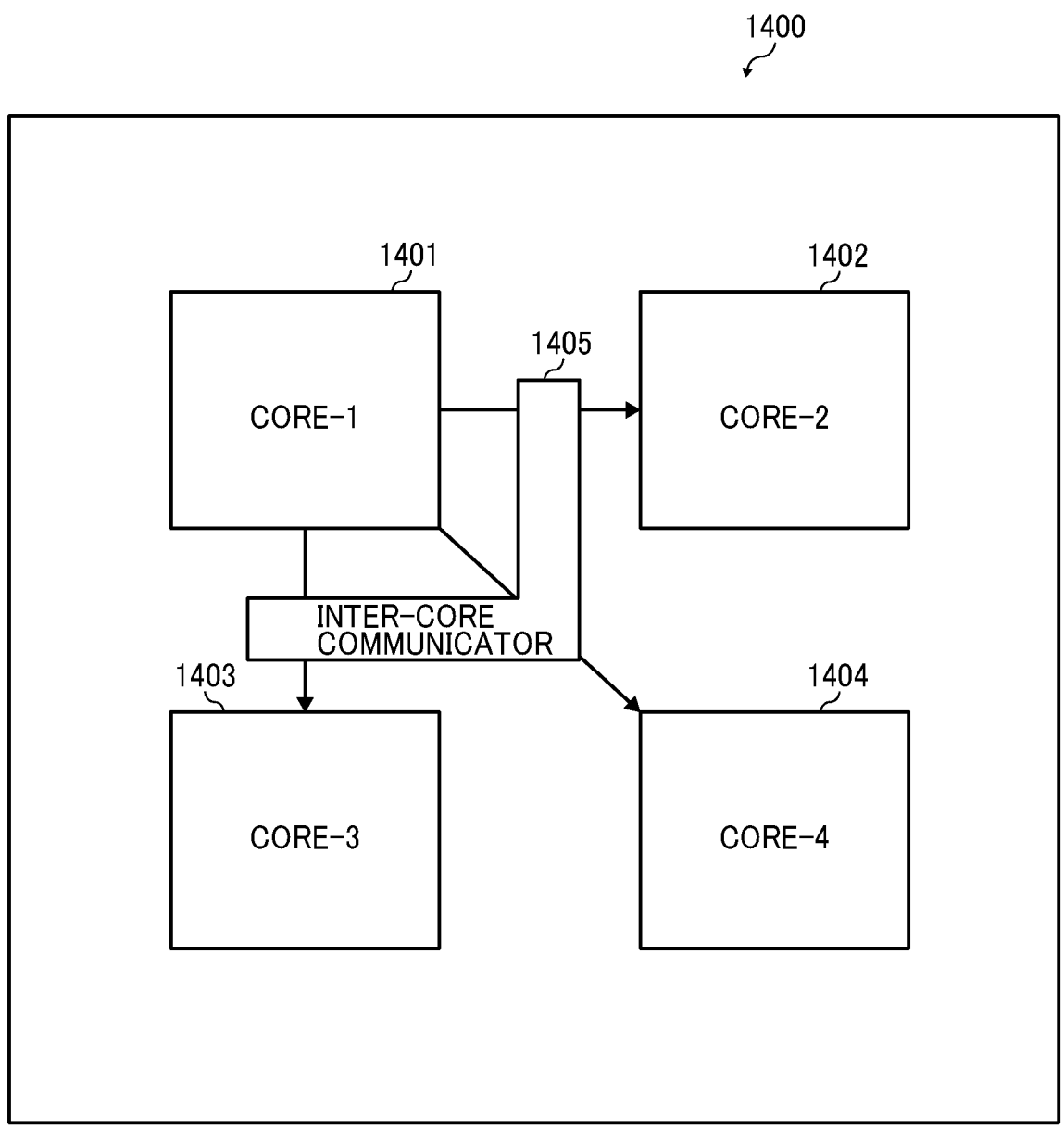
FIG. 14 is a diagram illustrating an embodiment of a case where the CPU 101 according to this embodiment has not two cores but four cores.

FIG. 14 illustrates an embodiment of a case where the CPU 1400 according to this embodiment has not two cores but four cores. In the case of four cores, each core can communicate through an inter-core communicator 1405. In the case of four cores, for example, a core-1 functions as an active monitoring unit (active monitoring means), and cores-2 through -4 function as passive monitoring units (passive monitoring means). At this time, the core-1 performs polling for the cores-2 through -4 through broadcast communication or multicast.

Then, the core-1 checks responses of the cores-2 through -4 to the polling and performs an error detecting process of step S1404 illustrated in FIG. 4 for each core. As a result, in a case where there is no response from any one of the cores-2 through -4, the core-1 determines that an error or a stall has occurred in the corresponding core and performs a restarting process.

Meanwhile, each of the passive monitoring units including the cores-2 through -4 determines an error or a stall of the core-1 by performing the process illustrated in FIG. 6. At this time, by performing OR processing of results of the cores-2 through -4, in a case where an abnormality of the core-1 is detected by at least one core, a restarting process may be performed. In addition, by performing AND processing of detection results acquired by the cores-2 through -4, a restarting process may be performed after all the cores-2 through -4 determine abnormalities. A process to be employed may be appropriately selected according to the stability of restarting of the CPU 1400, a time in which a CPU abnormality is allowed, and the like.

In addition, the cores-1 through -4 respectively mount the application managers 1 to 4 and can appropriately respond also to a fault process at the application level.

Third Embodiment

Hereinafter, a third embodiment will be described. In the second embodiment, as described with reference to FIG. 12, a full-size OS including an abnormality detecting mechanism such as UNIX (registered trademark) determines whether or not a failure such as a fault process has occurred in an application program and performs restarting in a case where a failure is determined to have occurred. In other words, in a case where an application program abnormally ends, the OS receives a notification from an application program for each type of abnormality and determines the occurrence of a failure based on the notification.

However, even when an application program does not abnormally ends, there are cases where an unrecoverable problem is caused, and system restarting is required. For example, there is a case where, in a main body of an apparatus such as a multi-function peripheral (MFP) including the main body and an operator, communication with the operator is disconnected. In other words, there is a case where, while an application program of the main body is not required to be abnormally ended, in order to recover communication with the operator, restarting is required. The case described here is an example, and the application is not limited to this example.

In view of the description presented above, a third embodiment to be described below has a form in which, in a case where an abnormality such as an unrecoverable fault process is detected while an application program is not abnormally ended, a recovery from an error state is made by resetting the CPU 101.

The functional blocks of software mounted in the CPU 101 according to the third embodiment are similar to the functional blocks 800 according to the second embodiment illustrated in FIG. 8, and thus, the description will be presented with reference to FIG. 8. However, description of contents that technically overlap will not be presented. Also here, it is assumed that a core 201 operates an RTOS as an OS-1, and a core 202 operates LINUX (registered trademark) as an OS-2. The OS-2 is a full-size OS having the abnormality detecting mechanism described above.

Applications App1 to App4 and so on operating on the core 201 issue notifications corresponding to the execution states to the OS-1 or the application manager-1, and, in a case where an unrecoverable abnormality is detected, issue system restart requests to the application manager-1. This process and subsequent processes have already been described with reference to FIG. 13, and thus, the description will not be presented here.

Meanwhile, each of applications App10 to App13 and so on operating on the core 202, in a case where an abnormality that is unrecoverable by the application is detected, spontaneously issues a system restart request to the application manager-2 without notifying the detected abnormality to the OS-2 and causing the abnormality to be detected by the OS-2. This point is different from the processing content described with reference to FIG. 12. For this reason, each of the applications App10 to App13 and so on functions as a restart requesting unit requesting restarting for the other core (in this embodiment, the core 201) in the third embodiment.

The subsequent process is similar to the process according to the second embodiment illustrated in FIG. 12. According to such a process, in a case where an unrecoverable abnormality is detected, by resetting the CPU 101 while minimizing the influence on the operation of the core of the side that normally operates, the whole CPU 101 can be returned to a normal state without abnormally ending the application program.

The third embodiment has a functional configuration similar to the functional configuration of the second embodiment, and the process is similar to the process described with reference to FIG. 12 except that each of applications App10 to App13 and so on operating on the core 202 spontaneously issues a system restart request. Thus, the execution list described with reference to FIGS. 9 and 10 can be used also in the third embodiment, and the use form and the use method are similar to the use form and the use method according to the second embodiment. In addition, a method of restarting the CPU 101 is performed in a stage in which a failure at the application level occurs, and a CPU core of the sounding side completes reset preparation, and accordingly, a flow similar to the flow of the restarting method described with reference to FIG. 11 is formed.

Figure 15:
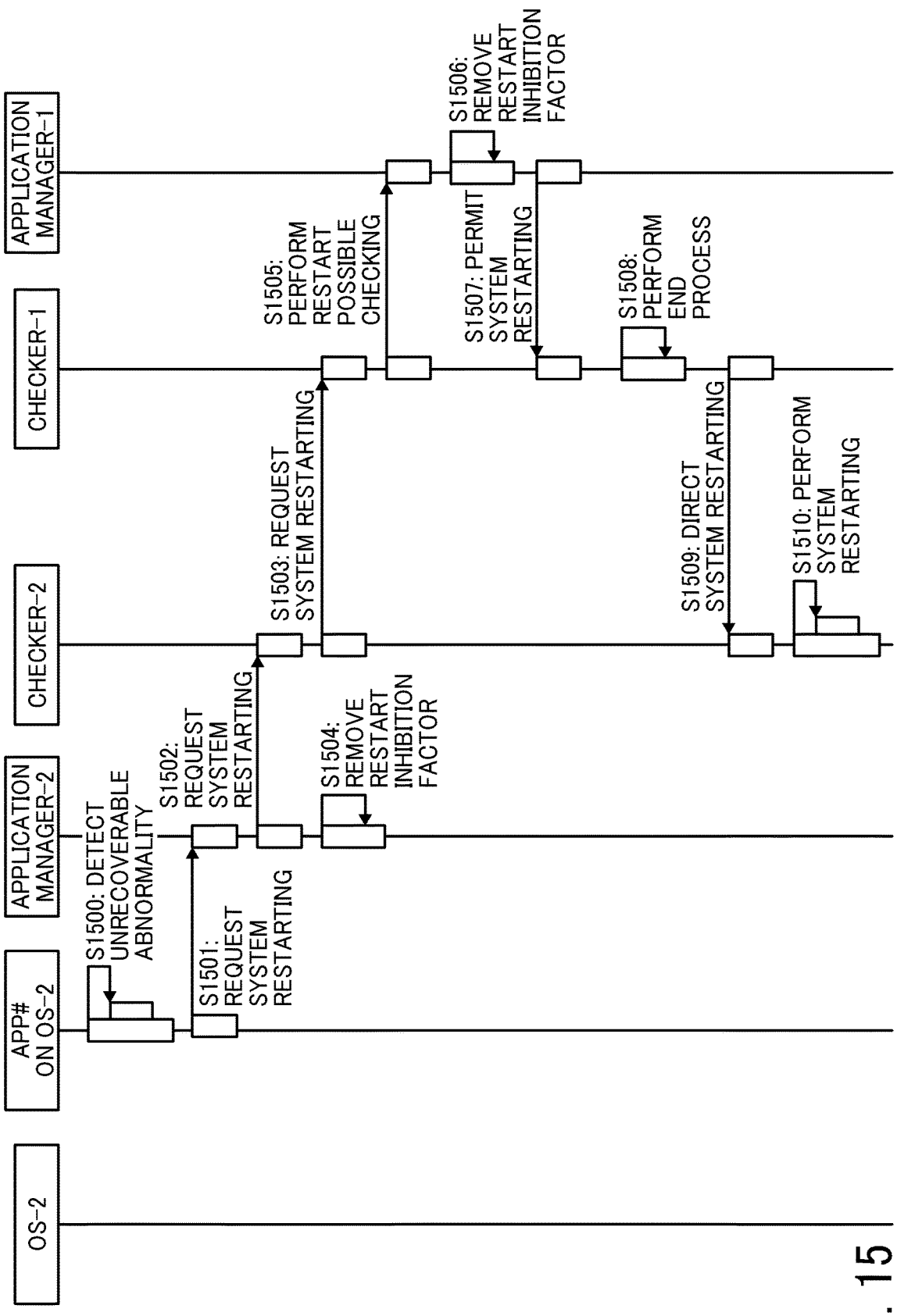
FIG. 15 is a sequence diagram of an error checking process of a case where an abnormality occurs in an application executed by a core 202 according to a third embodiment.

A reset process according to the third embodiment will be described in detail with reference to a sequence diagram illustrated in FIG. 15. In the case illustrated in FIG. 15, it is assumed that a failure of the application occurs in the core 202 operating the OS-2, and the OS-2 is UNIX (registered trademark) or an OS having compatibility with UNIX for the description.

In step S1500, an unrecoverable abnormality occurs in an application App # (here, # is an integer of "1" or more) operating on the OS-2, and the abnormality is detected. The abnormality is a communication disconnection described above or the like. In step S1501, the application App # that has detected the abnormality issues a system restart request to the application manager-2 mounted in the core 202 together with the OS-2. Since the application App # spontaneously issues the request to the application manager-2, a notification corresponding to the execution state as in the second embodiment is not issued to the OS-2.

While the subsequent process is similar to the process described with reference to FIG. 12, the process will be simply described. In step S1502, the application manager-2 receives the request and issues a system restart request to the checker-2. In step S1503, the checker-2 receives the request and issues a system restart request to the checker-1 of the core 201 that is the other core. In step S1504, the application manager-2 performs a process of removing a factor inhibiting the restart of the application executed under the management of the OS-2.

In step S1505, the checker-1 receives a request from the checker-1 and issues a restarting possible checking notification to the application manager-1 mounted in the core-1. The application manager-1 receives the notification and performs a process of removing a factor inhibiting the restart in step S1506. When the process ends, the application manager-1 issues a system restart permission notification to the checker-1 in step S1507. The checker-1 performs an end process in step S1508 and issues a system restart direction permitting the system restart to the core 202 that has detected the abnormality in step S1509.

The checker-2 of the core 202 that has detected the abnormality receives a direction from the checker-1 and starts a system restarting process in step S1510. Also in this case, since the external apparatus and the core 201 normally end at this time point, the core 202 can perform restart of the CPU 101 by causing the CPU 101 to start a bootstrap process by the authority of the core 202, and, accordingly, an abnormality occurring in the application program App # can be automatically resolved.

While the present disclosure has been described using a form in which one CPU 101 mounts a plurality of cores, in another embodiment, a system may have a plurality of CPUs configuring independent cores, including the plurality of CPUs configured to be synchronously restarted, and configured by the CPUs and a plurality of GPUs such as GPUs performing processes in association with the CPUs.

As described above, at least one embodiment of the present disclosure allows monitoring the runaway or stall of software without utilizing a watchdog timer for abnormality detection and adding an extra CPU to a system, to effectively restart an electronic apparatus.

In the above description, although example embodiments of the present disclosure have been described, embodiments of the present disclosure are not limited to the above-described example embodiments. Thus, changes such as formation of another embodiment, addition, modifications, and deletion within a range that can be considered by a person skilled in the art may be made in the embodiments, and any form belongs to the scope of the present disclosure as long as the actions and the effects of the present disclosure are accomplished.

The above-described embodiments are illustrative and do not limit present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:
1. An electronic apparatus comprising:
    a central processing unit (CPU), the CPU including,
        a plurality of cores, the plurality of cores including at least a first core and a second core, the first core including active monitoring means configured to actively monitor an abnormality of the second core, the second core including passive monitoring means configured to passively monitor an abnormality of the first core, the active monitoring means being configured to detect the abnormality of the second core based on absence of a response from the passive monitoring means for a first period of time, and the passive monitoring means being configured to detect the abnormality of the first core based on absence of an inquiry from the active monitoring means for a second period of time; and restarting means configured to restart the CPU in response to detection of the abnormality of the first core by the passive monitoring means of the second core or detection of the abnormality of the second core by the active monitoring means of the first core, wherein each of the plurality of cores is configured to execute at least one application program, and the plurality of cores includes, notification means configured to send a notification of a fault process of an application program executed by one core of the plurality of cores, removing means configured to remove a factor inhibiting end of the application program executed by the one core in which the fault process has occurred, and restart request means configured to issue a restart request to another core of the plurality of cores other than the one core executing the application program in which the fault process has occurred.

2. The electronic apparatus according to claim 1, further comprising an inter-core communication means configured to mutually monitor the active monitoring means and the passive monitoring means.

3. The electronic apparatus according to claim 1, wherein the plurality of cores executes at least one application program, and the plurality of cores includes, restart request means configured to receive detection of a fault process in an application program executed by one core of the plurality of cores, and issue a restart request to another core other than the one core executing the application program in which the fault process has occurred, and removing means configured to remove a factor inhibiting end of the application program executed by the one core in which the fault process has occurred.

4. A method of restarting a Central Processing Unit (CPU) including a plurality of cores, the plurality of cores including at least a first core and a second core, the method comprising:

actively monitoring an abnormality of the second core by the first core, the actively monitoring including detecting the abnormality of the second core based on absence of a response from the second core for a first period of time;

passively monitoring an abnormality of the first core by the second core, the passively monitoring including detecting the abnormality of the first core based on absence of an inquiry from the first core for a second period of time;

restarting the CPU in response to detection of the abnormality of the first core by the passively monitoring performed by the second core or detection of the abnormality of the second core by the actively monitoring performed by the first core;

executing at least one application program with the plurality of cores;

sending a notification of a fault process of an application program executed by one core of the plurality of cores;

removing a factor inhibiting end of the application program executed by the one core in which the fault process has occurred; and issuing a restart request to another core other than the one core executing the application program in which the fault process has occurred.

5. A non-transitory recording medium storing a program configured to cause the CPU including the plurality of cores to execute the method of restarting the CPU according to claim 4.

6. The method according to claim 4, further comprising:

executing at least one application program with the plurality of cores;

receiving detection of a fault process in an application program executed by one core of the plurality of cores;

issuing a restart request to another core other than the one core executing the application program in which the fault process has occurred; and removing a factor inhibiting end of the application program executed by the one core in which the fault process has occurred.

7. An electronic apparatus comprising:

an error detector; and a Central Processing Unit (CPU) including a plurality of cores, the plurality of cores including at least a first core and a second core, the first core including a first operating system, a first checker program, and a first application manager and one or more first applications configured to operate on the first operating system, the second core including a second operating system, a second checker program, and a second application manager and one or more second applications configured to operate on the second operating system, the first checker program being configured to, monitor operation of the one or more first applications, detect whether an abnormality of the one or more first applications has occurred, and notify the second checker program that the first core is to be reset in response to detecting the abnormality of the one or more first applications, the second checker program being configured to, monitor operation of the one or more second applications, detect whether an abnormality of the one or more second applications has occurred, and notify the first checker program that the second core is to be reset in response to detecting the abnormality of the one or more second applications, the error detector being configured to restart a power supply of the electronic apparatus in response to detection of the abnormality of the one or more first applications by the first checker program of the first core or detection of the abnormality of the one or more second applications by the second checker program of the second core, wherein the first application manager is configured to manage a first execution list indicating whether an immediate end is permitted, or a sequence for an end process is to be performed where immediate end is not appropriate, for each of the one or more first applications, respectively, and the second application manager is configured to manage a second execution list indicating whether an immediate end is permitted, or a sequence for an end process is to be performed where immediate end is not appropriate, for each of the one or more second applications, respectively.

8. The electronic apparatus according to claim 7, wherein each of the one or more first applications is configured to send a notification corresponding to an execution state of the one or more first applications, respectively, to the first operating system, the first operating system is configured to notify the first application manager of an abnormal end of at least one of the one or more first applications in response to a notification received from the at least one of the one or more first applications indicating occurrence of a fault process due to a failure in the at least one of the one or more first applications, the first application manager is configured to send a system restart request to the first checker program, and remove a restart inhibition factor with respect to the at least one of the one or more first applications in which the fault process has occurred, in response to the abnormal end of the at least one of the one or more first applications, the first checker program is configured to send the system restart request to the second checker program for notifying that the first core is to be reset, the second checker program is configured to send a request for checking whether restart is possible to the second application manager in response to receiving the system restart request from the first checker program, the second application manager is configured to remove a restart inhibition factor with respect to the one or more second applications in response to receiving the request from the second checker program, and send a reply indicating that restarting is permitted to the second checker program upon removing the restart inhibition factor with respect to the one or more second applications, the second checker program is configured to end the one or more second applications in a certain sequence according to the second execution list, perform an end process to save an execution state of the one or more second applications in a memory of the electronic apparatus, and send a reply directing system restarting to the first checker program upon completion of the end process, and the first checker program is configured to perform system restarting by notifying the error detector to restart the power supply in response to the reply received from the second checker program.

9. The electronic apparatus according to claim 7, wherein each of the one or more second applications is configured to send a notification corresponding to an execution state of the one or more second applications, respectively, to the second operating system, the second operating system is configured to notify the second application manager of an abnormal end of at least one of the one or more second applications in response to a notification received from the at least one of the one or more second applications indicating occurrence of a fault process due to a failure in the at least one of the one or more second applications, the second application manager is configured to send a system restart request to the second checker program, and remove a restart inhibition factor with respect to the at least one of the one or more second applications in which the fault process has occurred, in response to the abnormal end of the at least one of the one or more second applications, the second checker program is configured to send the system restart request to the first checker program for notifying that the second core is to be reset, the first checker program is configured to send a request for checking whether restart is possible to the first application manager in response to receiving the system restart request from the second checker program, the first application manager is configured to remove a restart inhibition factor with respect to the one or more first applications in response to receiving the request from the second checker program, and send a reply indicating that restarting is permitted to the first checker program upon removing the restart inhibition factor with respect to the one or more second applications, the first checker program is configured to end the one or more first applications in a certain sequence according to the first execution list, perform an end process to save an execution state of the one or more first applications in a memory of the electronic apparatus, and send a reply directing system restarting to the second checker program upon completion of the end process, and the second checker program is configured to perform system restarting by notifying the error detector to restart the power supply in response to the reply received from the first checker program.

10. The electronic apparatus according to claim 7, wherein at least one of the one or more first applications is configured to detect an unrecoverable abnormality, and send a system restart request to the first application manager, the first application manager is configured to remove a restart inhibition factor with respect to the one or more first applications in response receiving the system restart request from the at least one of the one or more first applications, and send a system restart request to the first checker program upon removing the restart inhibition factor with respect to the one or more first applications, the first checker program is configured to send the system restart request to the second checker program for notifying that the first core is to be reset, end the one or more first applications in a certain sequence according to the first execution list, and perform an end process to save an execution state of the one or more first applications in a memory of the electronic apparatus, the second checker program is configured to send the system restart request to the second application manager in response to receiving the system restart request from the first checker program, the second application manager is configured to remove a restart inhibition factor with respect to the one or more second applications in response to receiving the system restart request from the second checker program, and send a reply directing system restarting to the second checker program upon removing the restart inhibition factor with respect to the one or more second applications, the second checker program is configured to end the one or more second applications in a certain sequence according to the second execution list in response to the reply received from the second application manager, perform an end process to save an execution state of the one or more second applications in the memory of the electronic apparatus, and perform system restarting by notifying the error detector to restart the power supply upon completion of the end process.

11. The electronic apparatus according to claim 7, wherein at least one of the one or more second applications is configured to detect an unrecoverable abnormality, and send a system restart request to the second application manager, the second application manager is configured to remove a restart inhibition factor with respect to the one or more second applications in response to receiving the system restart request from the at least one of the one or more first applications, and send a system restart request to the second checker program upon removing the restart inhibition factor with respect to the one or more second applications, the second checker program is configured to send the system restart request to the first checker program for notifying that the second core is to be reset, end the one or more second applications in a certain sequence according to the second execution list, and perform an end process to save an execution state of the one or more second applications in a memory of the electronic apparatus, the first checker program is configured to send the system restart request to the first application manager in response to receiving the system restart request from the second checker program, the first application manager is configured to remove a restart inhibition factor with respect to the one or more first applications in response to receiving the system restart request from the first checker program, and send a reply directing system restarting to the first checker program upon removing the restart inhibition factor with respect to the one or more first applications, the first checker program is configured to end the one or more first applications in a certain sequence according to the first execution list in response to the reply received from the first application manager, perform an end process to save an execution state of the one or more first applications in the memory of the electronic apparatus, and perform system restarting by notifying the error detector to restart the power supply upon completion of the end process.

12. The electronic apparatus according to claim 7, wherein at least one of the one or more first applications is configured to detect an unrecoverable abnormality, and send a system restart request to the first application manager, the first application manager is configured to send a system restart request to the first checker program, and remove a restart inhibition factor with respect to the one or more first applications, in response receiving the system restart request from the at least one of the one or more first applications, the first checker program is configured to send the system restart request to the second checker program for notifying that the first core is to be reset, the second checker program is configured to send a request for checking whether restart is possible to the second application manager in response to receiving the system restart request from the first checker program, the second application manager is configured to remove a restart inhibition factor with respect to the one or more second applications in response to receiving the request from the second checker program, and send a reply indicating that restarting is permitted to the second checker program upon removing the restart inhibition factor with respect to the one or more second applications, the second checker program is configured to end the one or more second applications in a certain sequence according to the second execution list and perform an end process to save an execution state of the one or more second applications in a memory of the electronic apparatus, and send a reply directing system restarting to the first checker program upon completion of the end process, and the first checker program is configured to perform system restarting by notifying the error detector to restart the power supply in response to the reply received from the second checker program.

13. The electronic apparatus according to claim 7, wherein at least one of the one or more second applications is configured to detect an unrecoverable abnormality, and send a system restart request to the second application manager, the second application manager is configured to send a system restart request to the second checker program, and remove a restart inhibition factor with respect to the one or more second applications, in response receiving the system restart request from the at least one of the one or more second applications, the second checker program is configured to send the system restart request to the first checker program for notifying that the second core is to be reset, the first checker program is configured to send a request for checking whether restart is possible to the first application manager in response to receiving the system restart request from the second checker program, the first application manager is configured to remove a restart inhibition factor with respect to the one or more first applications in response to receiving the request from the first checker program, and send a reply indicating that restarting is permitted to the first checker program upon removing the restart inhibition factor with respect to the one or more first applications, the first checker program is configured to end the one or more first applications in a certain sequence according to the first execution list, perform an end process to save an execution state of the one or more first applications in a memory of the electronic apparatus, and send a reply directing system restarting to the second checker program upon completion of the end process, and the second checker program is configured to perform system restarting by notifying the error detector to restart the power supply in response to the reply received from the first checker program.

\* \* \* \* \*